No. 787,329. Patented April 11, 1905.

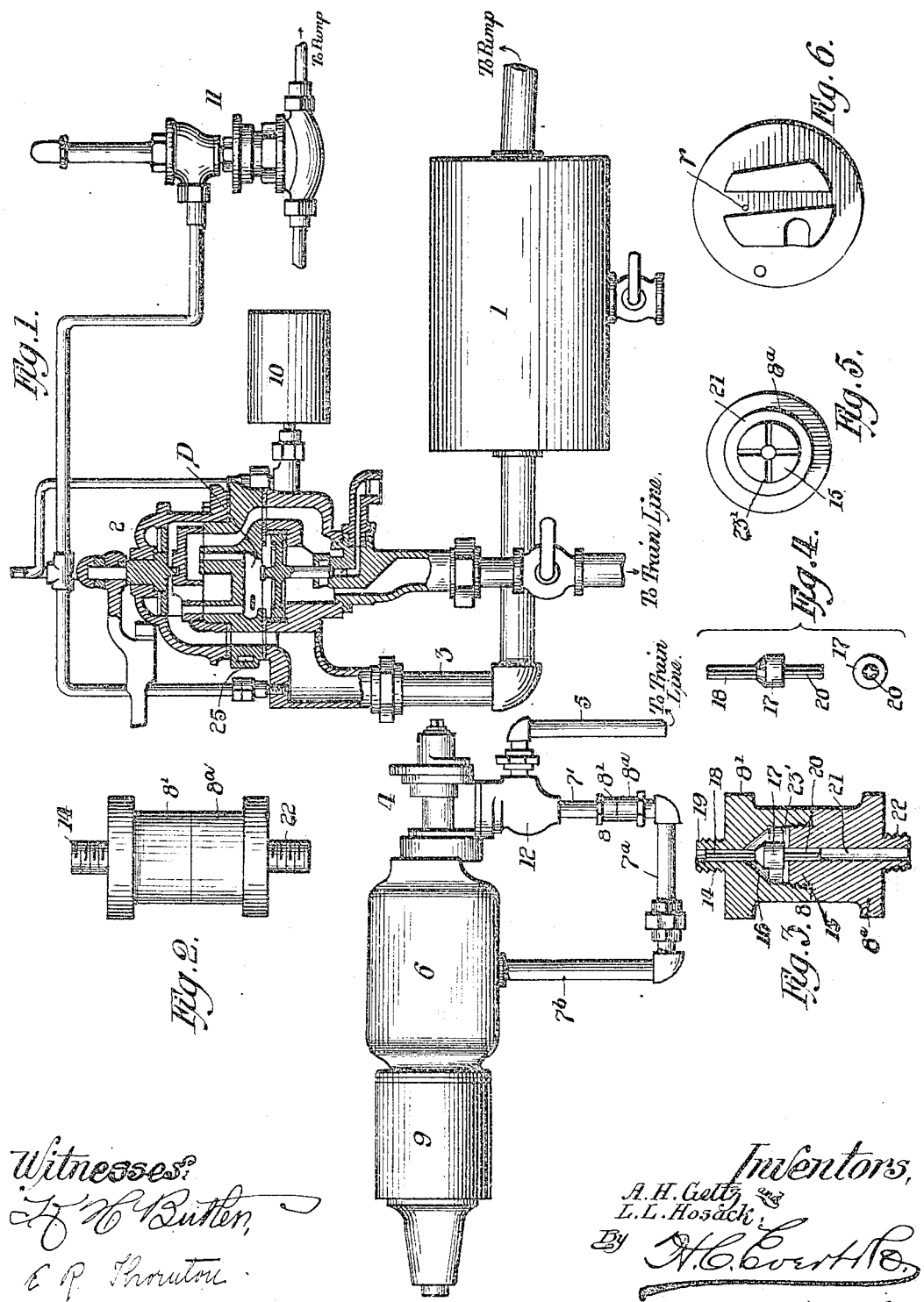

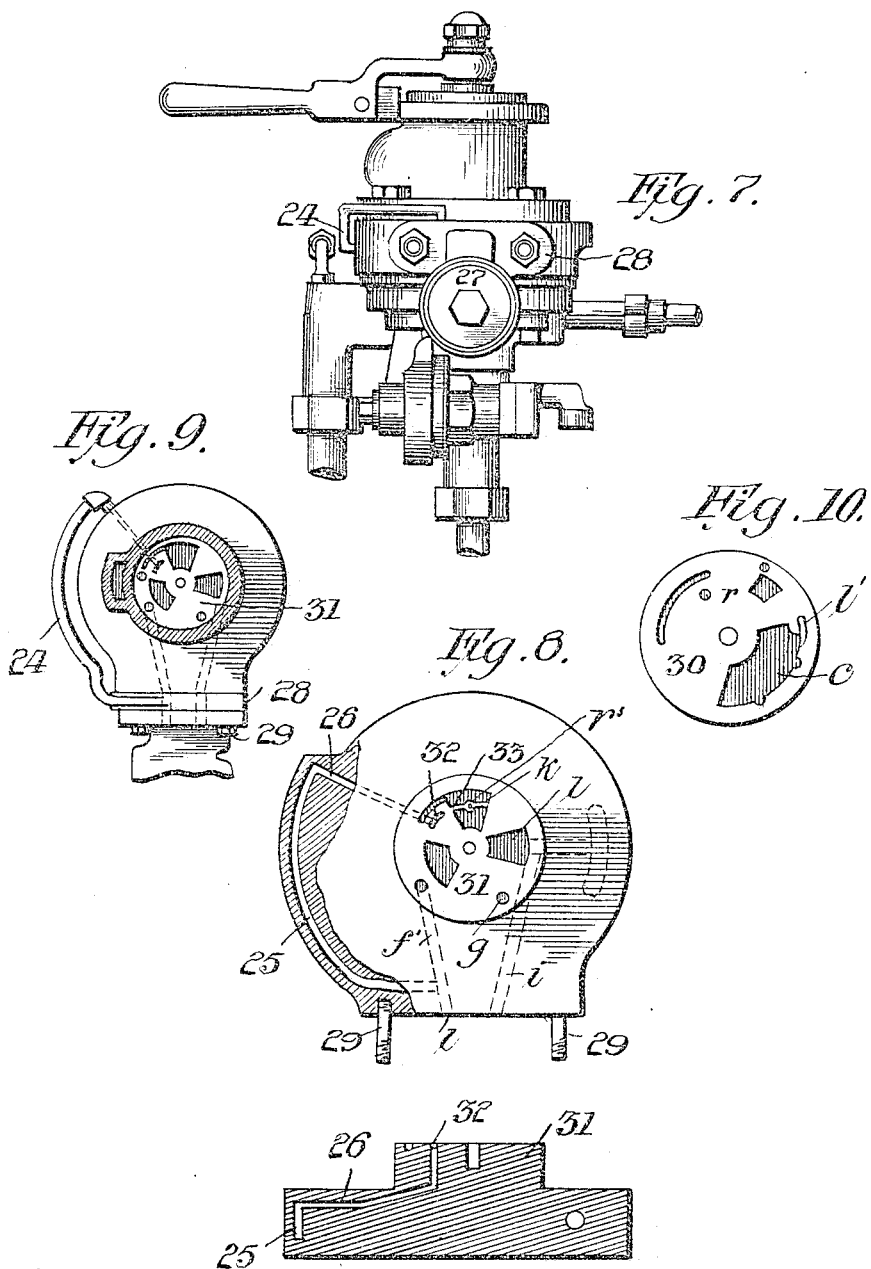

UNITED STATES PATENT OFFICE.

ALBERT H. GELTZ, OF ALLIANCE, AND LEE L. HOSACK, OF YOUNGSTOWN, OHIO, ASSIGNORS TO CHARLES B. McLEAN, OF PITTSBURG, PENNSYLVANIA.

AIR-BRAKE.

SPECIFICATION forming part of Letters Patent No. 787,329, dated April 11, 1905.

Application filed November 28, 1903. Serial No. 182,962.

*To all whom it may concern:*

Be it known that we, ALBERT H. GELTZ, residing at Alliance, in the county of Stark, and LEE L. HOSACK, residing at Youngstown, in the county of Mahoning, State of Ohio, citizens of the United States of America, have invented certain new and useful Improvements in Air-Brakes, of which the following is a specification, reference being had therein to the accompanying drawings.

This invention relates to certain new and useful improvements in air-brakes; and the invention has for its primary object the provision of means for the recharging of the auxiliary reservoir and train-line to normal pressure without releasing the brakes.

A still further object of the invention is to provide means for maintaining normal or substantially normal pressure in the train-line in event of there being slight leaks at any point or points in the line that would have a tendency to decrease the pressure in said line below that which it was desired to maintain.

Another object of the invention is to provide an equalizing drop-valve to effect the recharging of the auxiliary reservoir and train-line when brake-valve is on lap and which permits of the prompt charging of the auxiliary reservoir and train-line when the triple valve is in full-release position.

Briefly described, the invention comprises means for recharging the train-line and auxiliary reservoir with air while the engineer's brake-valve is on "lap" position, (or while communication is cut off between the auxiliary reservoir and train-line with the brake-valve.) This we accomplish by the employment of a valve interposed in the line between the auxiliary reservoir and train-line, which valve closes upon a reduction of pressure in the train-line and opens automatically by gravity when the pressure equalizes on the auxiliary-reservoir side and the train-line side of the triple-valve piston, and the provision of an auxiliary or supplemental port or passageway in the engineer's brake-valve.

More specifically stated, the invention embodies the provision of a port leading from the top of the rotary valve down partly through rotary-valve seat and from thence through a port in the valve-casing (or a pipe outside the casing) through middle section of the brake-valve, and taking main-reservoir pressure from the top of rotary valve when in lap position only and through feed-valve to train-line, thus allowing main-reservoir air to flow from top of rotary to the train-line, it being understood that in passage through the feed-valve the main-reservoir pressure is reduced to train-line pressure. From the train-line the air flows through a connection between the triple valve and the auxiliary reservoir without passing through the triple proper—that is, the connection is open at all times and the air flows therethrough except when there is a reduction of pressure in the train-line. In our application Serial No. 109,118 we show a means for recharging the auxiliary reservoir by a special construction of triple valve, but in the present invention recharge the said auxiliary reservoir without requiring special construction of the triple-valve piston.

In describing the invention in detail reference will be had to the accompanying drawings, forming a part of this application, and wherein like numerals of reference indicate like parts throughout the different views of the drawings, in which—

Figure 1 is a diagrammatical view, partly in section, of an air-brake constructed in accordance with our invention. Fig. 2 is a detached detail side elevation of the equalizing-valve between auxiliary reservoir and train-line connection. Fig. 3 is a longitudinal sectional view of the same. Fig. 4 is a detached detail side elevation and end view of the valve member. Fig. 5 is a detached end view of the lower member of the equalizing-valve casing. Fig. 6 is a detail top plan view of the rotary valve member of the engineer's brake-valve. Fig. 7 is an elevation of the engineer's valve equipped with one form of our improvement. Fig. 8 is a top plan view of a part of the brake-valve, partly in section, showing another form of our invention. Fig. 9 is a plan and horizontal section of the brake-valve, showing the form of connection as employed in Fig. 7. Fig. 10 is an underneath plan view of the rotary member of the brake-valve. Fig. 11 is a longitudinal sectional view of the valve-seat of the brake-valve.

In the drawings, 1 indicates the main reservoir; 2, the engineer's brake-valve in communication with the main reservoir through pipe 3; 4, the quick-action triple valve; 5, the train-line connecting engineer's brake-valve with the triple valve; 6, the auxiliary reservoir connected to quick-action triple valve 4 by pipe 7'; 8, an equalizing drop-valve interposed in pipe 7' between triple valve 4 and auxiliary reservoir 6; 9, the brake-cylinder; 10, the equalizing-reservoir; 11', the pipe leading to gage, (not shown,) and 11 the pump-governor.

To put our invention into practice we connect with the check-valve case 12 of the triple valve 4, either in the drain-port always provided or at any desirable point, one end of a pipe 7', the other end of this pipe being connected to the auxiliary reservoir 6. This pipe forms a supplemental air-passage between the train-line and the auxiliary reservoir. In this pipe is an equalizing drop-valve 8. This valve 8 has its casing formed of two members, one of which has a threaded nipple 15 to thread into the other member. (See Fig. 3.) In the upper member 8' is a valve-seat 16, which is engaged by valve 17, provided with a fluted stem 18, extending into port 19, and a fluted stem 20, extending into port 21, that extends into the lower member 8ᵃ. The lower member 8ᵃ carries on its lower end a threaded nipple 22 for connecting by pipes 7ᵃ 7ᵇ with the auxiliary reservoir 6, the port 21 extending through said nipple. The valve 17 is provided on its lower face with grooves 23 to permit the air to pass down through port 19, around the valve 17, (when the latter is unseated,) and through said grooves 23 and through grooves 23' in plug 15 to the port 21, pipes 7ᵃ and 7ᵇ to the auxiliary reservoir 6. This attachment just described in detail forms the means for conducting the air from the train-line to the auxiliary reservoir at all times, except when there is a reduction of pressure on the train-line side, and then the valve 17 closes against seat 16 on account of higher pressure in the reservoir and is opened again when pressure is equalized.

In connection with this attachment just described we employ means in connection with the engineer's brake-valve for permitting air to pass from the main reservoir to the train-line and (through the attachment aforedescribed) to the auxiliary reservoir when the engineer's brake-valve is on lap, or, in other words, when the brakes are set. To accomplish this, we provide a construction and arrangement for conducting air from main-reservoir pressure to the train-line, and in Figs. 7, 8, and 9 two embodiments of the invention are shown. In Figs. 7 and 9 we show the employment of a pipe 24, forming the passage-way or port from the rotary-valve chamber (above rotary valve) to the feed-passage leading into the chamber beneath the rotary, while in Fig. 8 we show port or passage-way 25, made directly in the casing of the valve. Where the present engineer's brake-valve is to be equipped with our improvements, the pipe 24 is employed, and where the engineer's valve is constructed in accordance with the invention it may be preferable to provide the port 25 direct in the valve-casing. Communicating either with the pipe 24 or passage-way or port 25, as the case may be, is a by-pass or port 26, leading in through the valve-casing, the port 25 or port 24 at its other end communicating with feed-passage $f'$, that leads from slide-valve feed-valve 27 to the rotary-valve chamber. In the construction shown in Figs. 7 and 9—that is, where the attachment is to be made to a brake-valve already in use or already constructed—the pipe 24 is at its one end tapped into the engineer's brake-valve casing to communicate with port 26 and this pipe carried partly around the casing and its other end tapped into a block 28, mounted on the studs 29, that secure the slide-valve feed-valve to the engineer's brake-valve. The passage $f'$ and passage or feed-port $i$ extend through the block 28 and establish communication between the engineer's valve and the slide-valve feed-valve in the usual manner. The port 26 extends inwardly through the brake-valve casing, care being exercised in the drilling thereof to avoid intersecting with other ports of the brake-valve, and at its termination this port communicates with port $r$ in the rotary 30. In the usual construction of brake-valve this port $r$ is provided and is known as the "warning-port," and it is employed for the purpose of discharging main-reservoir pressure to the atmosphere while the brake-valve is in release position in order to make a noise to attract the engineer's attention if he subsequently neglects to move the handle to running position. In our invention we preferably simply tap out this hole, so as to make it of larger diameter and extend port 26 into communication therewith, preferably grooving the valve-seat 31, as at 32, at opposite sides of the termination of port 26, the groove being on the arc of a circle, so as to insure registry with warning-port $r$. In order not to destroy the utility of the port $r$ for giving the warning sound, we provide a bridge 33, having a warning-port $r'$. This bridge extends across the chamber $k$ in the valve-seat 31, so as to close port $r$ (except its registry with port $r'$) when the rotary valve is moved to register with chamber $k$, at which time the brake-valve handle is in release position.

It will be evident that instead of utilizing port $r$ to register with port 26 we may provide an additional port in the rotary valve.

It is understood, of course, that in the air-brake system main-reservoir pressure is always on top of the rotary valve member of the engineer's valve, so that with our apparatus as described the operation is as follows:

When the engineer's brake-valve lever is on lap position, the brakes have been set, and communication between the train-line and auxiliary reservoir through the triple valve is shut off. With the brake-valve in this position with our attachment port $r$ is in communication through groove 32 with port 26 and with port 25 (or through pipe 24, as the case may be) with passage $f'$ through slide-valve feed-valve 27, reducing pressure from main-reservoir pressure to train-line pressure, and through feed-passage $i$ to the train-line 5 in the usual manner. Train-line pressure is also at this time in cavity $c$ of the rotary, direct application, and supply-port 1, thence through groove 1' in rotary to port $g$ in rotary seat, charging chamber D, Fig. 1, in lap position of the brake-valve. As before stated, communication between the train-line and auxiliary reservoir through the triple valve is closed, (due to the brakes being set,) and the air consequently passes from train-line 5 into case 12 and from thence through valve 8 and pipes $7^a$ $7^b$ into the auxiliary reservoir, thus restoring the train-line and auxiliary reservoir to normal pressure while the brakes are set. It will thus be seen that we effect this recharging of the auxiliary reservoir entirely independent of the triple valve. When train-line pressure is reduced by an application of the brakes, valve 17 is lifted and seats and only opens when pressure equalizes in train-line and auxiliary reservoir. It is to be understood that the connection embracing pipes 7' $7^a$ $7^b$ and valve 8 is to be employed with each triple valve and auxiliary reservoir used. In all other positions of the brake-valve the same operates in the usual and well-known manner. In full-release position of the brakes the equalizing drop-valve provides means for quickly charging train-line and auxiliary reservoir to their normal pressure.

It will be obvious that various slight changes may be made in the details of construction without departing from the general spirit of our invention.

Having fully described our invention, what we claim as new, and desire to secure by Letters Patent, is—

1. The herein-described means for recharging the train-line and auxiliary reservoir of air-brakes while the brakes are set, comprising in connection with the main reservoir, the engineer's brake-valve connected thereto, the feed-valve, the triple valve, the auxiliary reservoir, the train-line connected to the feed-valve and triple-valve casing, and a connection between the triple-valve casing and the auxiliary reservoir, a supplemental passageway or port leading from the top of the rotary member of the engineer's brake-valve and establishing communication between the chamber above said rotary member and the feed-valve when the engineer's brake-valve is on lap position, and a gravity-opening valve in the connection between the auxiliary reservoir and triple-valve casing which opens automatically on the equalization of pressure in the train-line and auxiliary reservoir.

2. A means for recharging the train-line and auxiliary reservoir of air-brakes while the brakes are set, comprising in combination with the main reservoir, the engineer's brake-valve, the triple valve, the auxiliary reservoir, and the train-line, of means for establishing communication from the chamber over the rotary member of the engineer's brake-valve to the train-line when the engineer's brake-valve is on lap position, a connection between the auxiliary reservoir and the triple-valve casing, and a valve in said connection which closes upon a reduction of pressure on train-line side of the triple valve and opens when pressure on train-line side and auxiliary-reservoir side of the triple valve equalizes.

3. A means for recharging the train-line and auxiliary reservoir of air-brakes while the brakes are set, comprising in combination with the main reservoir, the engineer's brake-valve, the triple valve, the auxiliary reservoir, and the train-line, of means for establishing communication from the chamber over the rotary member of the engineer's brake-valve to the train-line when the engineer's brake-valve is on lap position, a connection between the auxiliary reservoir and the triple-valve casing, and a valve in said connection which closes upon a reduction of pressure on train-line side of the triple valve and opens by gravity when pressure on train-line side and auxiliary-reservoir side of the triple valve equalizes.

4. In an engineer's air-brake valve provided with a feed-valve in communication with a train-line, and having a rotary member provided with a warning-port, the combination therewith of a supplemental port or passageway which registers, when the brake-valve is on lap position, with the warning-port in the rotary member of the brake-valve, and establishes communication between the chamber over the rotary member and the train-line through the feed-valve, and said port being closed by the rotary member in all other positions of the latter.

5. In air-brakes, the combination with the train-line, the triple valve and the auxiliary reservoir, of a connection between the triple-valve casing and the auxiliary reservoir, and independent of the main connection between said triple-valve casing and auxiliary reservoir, and a valve interposed in said independent connection which closes upon a reduction of pressure on the train-line side of the triple valve and opens by gravity when the pressure on the train-line side and the auxiliary-reservoir side of the triple valve is equalized.

6. In an engineer's air-brake valve including a feed-valve in communication with a train-line and having a rotary member, of a supplemental free port or open passage-way leading from a point within the periphery of the rotary member to a point in the feed-valve passage outside the periphery of the rotary member, and establishing communication when the valve is on lap position between the chamber over the rotary member and the train-line through the feed-valve, said supplemental port or passage-way being closed by the rotary member in all except lap position of the latter.

7. In air-brakes the communication with the train-line, the triple valve, and the auxiliary reservoir, of a supplemental air-passage between the train-line and the auxiliary reservoir, and independent of the main air-passage between said train-line and auxiliary reservoir, and a valve in said supplemental air-passage which closes upon a reduction of pressure on the train-line side of the triple valve and opens by gravity when the pressure on the train-line side and auxiliary-reservoir side of the triple valve is equalized.

8. A means for recharging the train-line and auxiliary reservoir of air-brakes while the brakes are set, comprising in combination with the main reservoir, the engineer's brake-valve, the triple valve, the auxiliary reservoir, and the train-line, of means for establishing communication from the main reservoir to the train-line when the engineer's brake-valve is on lap position, a connection from a point on the auxiliary-reservoir pressure side of the triple valve to the train-line, and a valve in said connection which closes upon a reduction of pressure on train-line side of the triple valve and opens when pressure on train-line side and auxiliary-reservoir side of the triple valve is equal.

In testimony whereof we affix our signatures in the presence of two witnesses.

ALBERT H. GELTZ.
LEE L. HOSACK.

Witnesses:
A. M. WILSON,
E. E. POTTER.